(12) United States Patent
Jeong et al.

(10) Patent No.: US 8,971,710 B2
(45) Date of Patent: Mar. 3, 2015

(54) OPTICAL LINE TERMINAL FOR BIDIRECTIONAL WAVELENGTH-DIVISION-MULTIPLEXING OPTICAL NETWORK

(71) Applicant: Electronics and Telecommunications Research Institute, Daejeon (KR)

(72) Inventors: Jong Sool Jeong, Daejeon (KR); Hyun Soo Kim, Daejeon (KR); Byungseok Choi, Daejeon (KR); Mi-Ran Park, Daejeon (KR); O-Kyun Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 136 days.

(21) Appl. No.: 13/739,027

(22) Filed: Jan. 11, 2013

(65) Prior Publication Data
US 2013/0209094 A1   Aug. 15, 2013

(30) Foreign Application Priority Data

Feb. 9, 2012   (KR) .................. 10-2012-0013394
Jul. 4, 2012    (KR) .................. 10-2012-0072809

(51) Int. Cl.
*H04B 10/564*   (2013.01)
*H04B 10/079*   (2013.01)
*H04J 14/02*    (2006.01)

(52) U.S. Cl.
CPC ......... *H04J 14/0221* (2013.01); *H04J 14/0246* (2013.01); *H04J 14/025* (2013.01); CPC . *H04J14/0258* (2013.01); *H04J 14/0265* (2013.01); *H04J 14/0276* (2013.01); *H04J 14/0282* (2013.01)
USPC .......................................................... 398/70

(58) Field of Classification Search
CPC ............ H04B 10/079; H04B 10/0793; H04B 10/0795; H04B 10/506; H04B 10/564

USPC ...................................................... 398/70–73
See application file for complete search history.

(56) References Cited

U.S. PATENT DOCUMENTS 7,526,200 B2     4/2009  Nakano et al.
2006/0222364 A1* 10/2006  Chung et al. ................ 398/72

FOREIGN PATENT DOCUMENTS

KR   10-2004-0023305 A   3/2004
KR   10-2004-0024733 A   3/2004

OTHER PUBLICATIONS

H. Hasu et al., "Ultrahigh Wavelength Stability Through Thermal Compensation in Wavelength-Monitor Integrated Laser Modules", IEEE Photonics Technology Letters, Mar. 2003, pp. 380-382, vol. 15, No. 3.

(Continued)

*Primary Examiner* — Leslie Pascal
(74) *Attorney, Agent, or Firm* — Rabin & Berdo, P.C.

(57) ABSTRACT

The present disclosure relates to an optical line terminal, the disclosure includes: an optical transmitter for generating a low speed downstream optical signal; a wavelength-multiplexer for wavelength-multiplexing the downstream optical signal; a first optical power branching tap coupler for allowing wavelength-multiplexed downstream optical signal to branch off; a wavelength band separator/coupler for separating between the wavelength-multiplexed downstream optical signal and a wavelength-multiplexed upstream optical signal; a circulation type wavelength-demultiplexer for wavelength-demultiplexing a downstream optical signal branched off by the first optical power branching tap coupler and an upstream optical signal separated by the wavelength band separator/coupler; an optical receiver for outputting a downstream electrical signal by using the wavelength-demultiplexed optical signal; and a signal processing module for controlling an optical power and a wavelength of the optical transmitter according to a strength of the downstream electrical signal.

11 Claims, 5 Drawing Sheets

(56) References Cited
OTHER PUBLICATIONS

Runxiang Yu et al., "High-Precision In-situ Wavelength Stabilization and Monitoring of Tunable Lasers Using AWG and PD Arrays", Optical Society of America/Optical Fiber Communication Conference and Exposition (OFC/NFOEC), Mar. 6-10, 2011, pp. 1-3.

* cited by examiner

OPTICAL LINE TERMINAL FOR BIDIRECTIONAL WAVELENGTH-DIVISION-MULTIPLEXING OPTICAL NETWORK

CROSS-REFERENCE TO RELATED APPLICATIONS

This application is based on and claims priority from Korean Patent Application Nos. 10-2012-0013394, filed on Feb. 9, 2012, and 10-2012-0072809, filed on Jul. 4, 2012, with the Korean Intellectual Property Office, the disclosure of which is incorporated herein in its entirety by reference.

TECHNICAL FIELD

The present disclosure relates to a bidirectional wavelength-division-multiplexing (WDM) optical network, and more particularly, to an optical line terminal for controlling and monitoring an optical power and a wavelength of downstream optical signals in a bidirectional wavelength-division-multiplexing optical network.

BACKGROUND

A wavelength division multiplexing (WDM) scheme is a scheme for transmitting a plurality of optical signals having different wavelengths through one optical fiber. A WDM optical network includes a central office (CO), optical network units (ONUs), and an optical distribution network for interconnecting the CO and the ONUs. Among various optical distribution networks, there is the most economical technique in which a remote node (RN) including a wavelength-multi/demultiplexer is arranged in a neighboring area of optical network units, the CO and the RN are connected with each other through a single optical fiber, and the RN and the ONUs are then connected with each other through optical fibers.

Currently, a best-known technique of a WDM optical network is to separate wavelength bands for downstream optical signals and upstream optical signals and uses different wavelength bands for them. In the technique of the WDM optical network of wavelength-band separable scheme as described above, it is most typical that a circulation type wavelength-multiplexer/demultiplexer is disposed in each of the CO and the RN, the CO-wavelength-multiplexer/demultiplexer is connected with the RN-wavelength-multiplexer/demultiplexer through a single optical fiber, and respective ports of the wavelength-multiplexer/demultiplexers is then connected to ONUs. In this event, an optical transceiver includes a wavelength-band separable optical filter, an optical transmitter, and an optical receiver. The narrower the wavelength-separable band is, the more difficult it is to technically implement the wavelength-band separable optical filter. Therefore, when an upstream optical signal is used in a C-band wavelength band and a downstream optical signal is used in an L-band wavelength band, it has been frequent to employ a scheme for separating an optical module for wavelength-multiplexing the upstream optical signal and an optical module for wavelength-demultiplexing the downstream optical signal to the CO from each other.

For the conventional optical line terminal (OLT) of the WDM optical network which employs the scheme of separating the wavelength-multiplexer and wavelength-demultiplexer from each other as described above, there have been many proposals for schemes of controlling and monitoring an optical power and a wavelength of an optical transmitter of an OLT. A representative control/monitoring scheme proposes an output unit of the wavelength-multiplexer which includes an optical power branching tap coupler, a control/monitoring wavelength-demultiplexer, and a light-receiving device. To this end, it is required to add the wavelength-demultiplexer, which may increase the size and construction costs of the system. In order to overcome the demerits as described above, schemes wherein a reflection type tap coupler is put in the output unit of the wavelength-multiplexer and a control/monitoring light-receiving device is disposed before the optical transmitter have been proposed. However, these schemes also have problems in that they require a multichannel reference signal generating apparatus and a costly lock-in-amp, which complicates the system construction and increases the costs.

SUMMARY

The present disclosure has been made in an effort to provide an optical line terminal for controlling and monitoring an optical power and a wavelength of downstream optical signals in a bidirectional wavelength-division-multiplexing optical network.

Another aspect of the present disclosure is to provide an optical line terminal of various constructions for controlling and monitoring an optical power and a wavelength of downstream optical signals in a bidirectional wavelength-division-multiplexing optical network.

For achieving such a purpose, in accordance with a first aspect of the present invention, an optical line terminal for controlling and monitoring an optical power and a wavelength of downstream optical signals in a bidirectional wavelength-division-multiplexing (WDM) based optical network, includes: an optical transmitter for generating a low speed downstream optical signal; a wavelength-multiplexer for wavelength-multiplexing the downstream optical signal; a first optical power branching tap coupler for allowing the wavelength-multiplexed downstream optical signal to branch off; a wavelength band separator/coupler for separating between the wavelength-multiplexed downstream optical signal and a wavelength-multiplexed upstream optical signal; a circulation type wavelength-demultiplexer for wavelength-demultiplexing a downstream optical signal branched off by the first optical power branching tap coupler and an upstream optical signal separated by the wavelength band separator/coupler; an optical receiver for outputting a downstream electrical signal by using the wavelength-demultiplexed optical signal; and a signal processing module for controlling an optical power and a wavelength of the optical transmitter according to a strength of the downstream electrical signal.

In accordance with a second aspect of the present invention, an optical line terminal for controlling and monitoring an optical power and a wavelength of downstream optical signals in a bidirectional wavelength-division-multiplexing (WDM) based optical network includes: an optical transmitter for generating a low speed downstream optical signal; a wavelength-multiplexer for wavelength-multiplexing the downstream optical signal; an optical circulator for circulating wavelength-multiplexed downstream optical signal and wavelength-multiplexed upstream optical signal and recirculating reflected optical signal; a reflection type tap coupler for reflecting circulated optical signal; a circulation type wavelength-demultiplexer for wavelength-demultiplexing recirculated optical signal; an optical receiver for outputting a downstream electrical signal by using the wavelength-demultiplexed optical signal; and a signal processing module for controlling an optical power and a wavelength of the optical transmitter according to a strength of the downstream electrical signal.

In accordance with a third aspect of the present invention, an optical line terminal for controlling and monitoring an optical power and a wavelength of downstream optical signals in a bidirectional wavelength-division-multiplexing (WDM) based optical network includes: an optical transmitter for generating a high speed downstream optical signal; a wavelength-multiplexer for wavelength-multiplexing the downstream optical signal; a first optical power branching tap coupler for allowing wavelength-multiplexed downstream optical signal to branch off; a wavelength band separator/coupler for separating between the wavelength-multiplexed upstream optical signal and a wavelength-multiplexed downstream optical signal; a circulation type wavelength-demultiplexer for wavelength-demultiplexing downstream optical signal branched off by the first optical power branching tap coupler and upstream optical signal separated by the wavelength band separator/coupler; an optical receiver for outputting the downstream electrical signal by using wavelength-demultiplexed optical signal; and a signal processing module for controlling an optical power and a wavelength of the optical transmitter according to a strength of the downstream electrical signal.

In accordance with a fourth aspect of the present invention, an optical line terminal for controlling and monitoring an optical power and a wavelength of downstream optical signals in a bidirectional wavelength-division-multiplexing (WDM) based optical network includes: an optical transmitter for generating a high speed downstream optical signal, allowing wavelength-demultiplexed downstream optical signal to branch off and outputting a downstream electrical signal by using branched off downstream optical signal; a first wavelength-multiplexer for wavelength-multiplexing the downstream optical signal and wavelength-demultiplexing fed back downstream optical signal; a reflection type tap coupler for reflecting wavelength-multiplexed downstream optical signal and feeding back the wavelength-multiplexed downstream optical signal to the first wavelength-multiplexer; a signal processing module for controlling an optical power and a wavelength of the optical transmitter according to a strength of the downstream electrical signal; a wavelength band separator/coupler for separating between the wavelength-multiplexed downstream optical signal and wavelength-multiplexed upstream optical signal; a second wavelength-multiplexer for wavelength-multiplexing separated optical signal; and an optical receiver for converting an optical signal wavelength-demultiplexed by the second wavelength-multiplexer into an electrical signal.

According to the exemplary embodiments of the present disclosure, the present disclosure provides an optical line terminal capable of separating between a high speed upstream optical signal and a low speed control/monitoring downstream optical signal into a high frequency signal and a low frequency signal. Therefore, the present disclosure can prevent a mutual interruption between a signal transferring system and a control/monitoring signal system and can fundamentally interrupt an influence of signal distortion caused by a reflected light of optical parts, a Rayleigh backscattering generated when a single optical line is used, or the like, thereby constructing a high quality control/monitoring system.

Furthermore, the present disclosure can provide an optical line terminal which does not require a wavelength-multi/demultiplexer and a light-receiving device for control/monitoring optical signals, which makes it possible to easily achieve simplification, miniaturization, and price reduction of the optical line terminal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Hereinafter, exemplary embodiments of the present disclosure will be described in detail with reference to the accompanying drawings. In a description of the present disclosure, a detailed description of related known configurations and functions will be omitted when it may make the essence of the present disclosure obscure.

Figure 1:
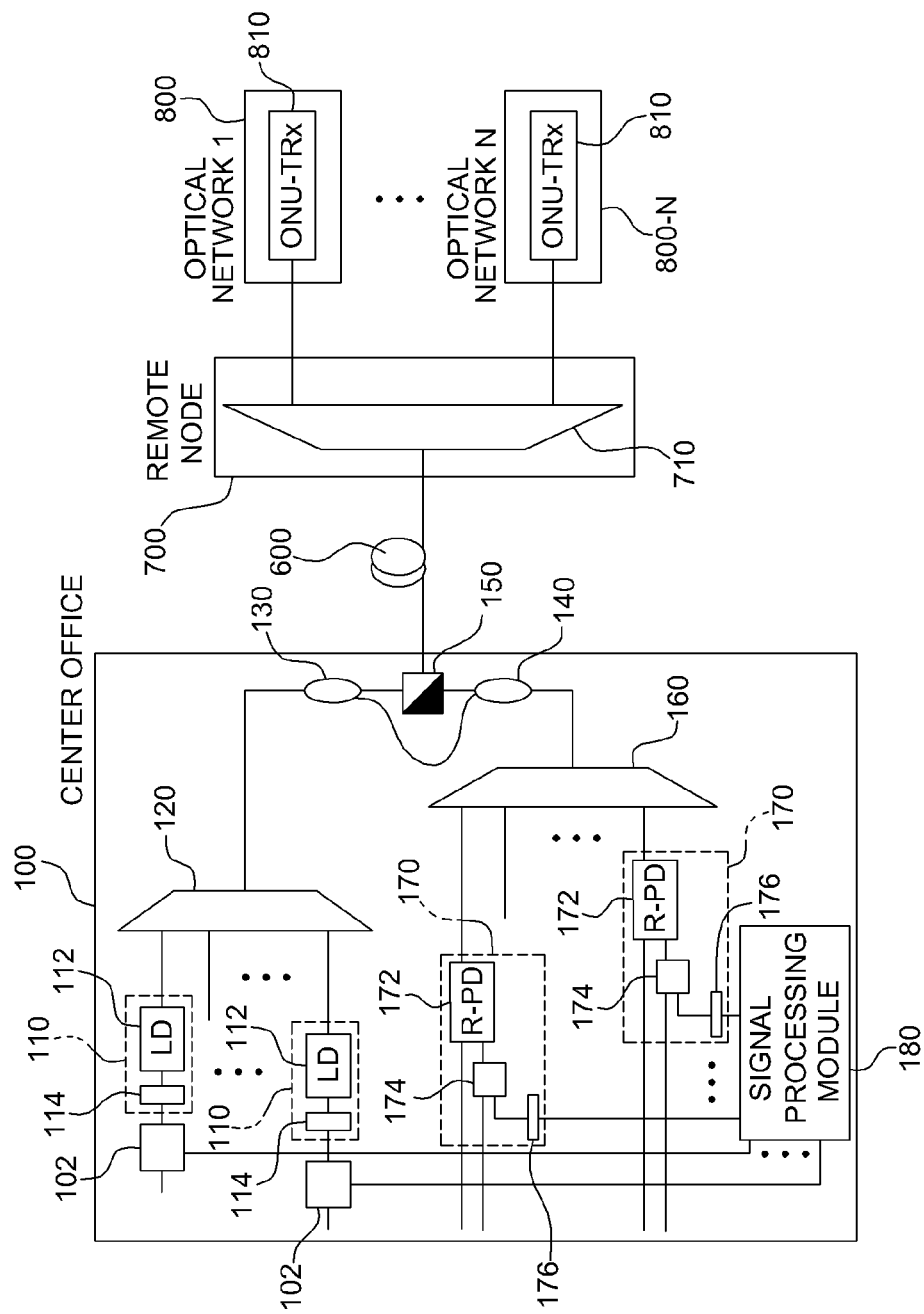
FIG. 1 is a block diagram illustrating a construction of an optical line terminal for controlling and monitoring an optical power and a wavelength of downstream optical signals in a bidirectional wavelength-division-multiplexing (WDM) based optical network according to a first embodiment of the present invention.

FIG. 1 is a block diagram illustrating a construction of an optical line terminal for controlling and monitoring an optical power and a wavelength of downstream optical signals in a bidirectional wavelength-division-multiplexing (WDM) based optical network according to a first embodiment of the present invention.

Referring to FIG. 1, an optical line terminal (OLT) 100 according to the first embodiment of the present invention is an apparatus located in a central office (CO) and includes an optical transmitter 110, a wavelength-multiplexer 120, two optical power branching tap couplers 130 and 140, a wavelength band separator/coupler 150, a circulation type wavelength-demultiplexer 160, an optical receiver 170, and a signal processing module 180. Moreover, the OLT 100 further includes an optical source driver 102 for controlling the optical transmitter 110. The optical source driver 102 controls an optical source 112 by controlling an electric current flowing in the optical source 112 as described below.

The optical transmitter 110 generates a low speed downstream optical signal by adding a modulation signal of a low frequency band for controlling and monitoring to a downstream optical signal which have been modulated into high speed signals for data transmission. The frequency of the downstream optical signal corresponds to a low frequency of about 1 kHz.

To this end, the optical transmitter 110 includes the optical source 112 for generating a high speed downstream optical signal and a low frequency generator 114 for generating a modulation signal of a low frequency band. The optical source 112 may be a wavelength-tunable laser optical source, a wavelength-fixed laser optical source, a broadband incoherent optical source, an external-insert wavelength-fixed broadband optical source, or the like.

The wavelength-multiplexer 120 wavelength-multiplexes a downstream optical signal generated by the optical transmitter 110. The wavelength-multiplexer 120 is a wavelength-multiplexer/de-multiplexer which is implemented so as to make a center wavelength of a channel and a frequency interval thereof have a regular value, and may be configured by an Arrayed Waveguide Grating (AWG) and a thin film filter.

The optical power branching tap couplers 130 and 140 allow the downstream optical signal wavelength-multiplexed by the wavelength-multiplexer 120 to branch off. In this event, the optical power branching tap couplers 130 and 140 transmit most of the optical power to an optical fiber 600 for an optical line and transmit only a small part of the optical power to the circulation type wavelength-demultiplexer 160.

Meanwhile, optical transmitters 810 of the optical network units (ONUs) 800 transmit upstream optical signal generated through a high speed modulation to a wavelength-multiplexer 710 of a remote node (RN) 700. The wavelength-multiplexer 710 of the RN 700 wavelength-multiplexes the upstream optical signal and transmits wavelength-multiplexed upstream optical signal to the wavelength band separator/coupler 150. The wavelength band separator/coupler 150 separates the upstream optical signal having been wavelength-multiplexed by the wavelength-multiplexer 710 of the RN 700 into signals according to their wavelength bands and transmits the separated signals of respective wavelength bands to the circulation type wavelength-demultiplexer 160.

The circulation type wavelength-demultiplexer 160 wavelength-demultiplexes the downstream optical signal branched off by the optical power branching tap couplers 130 and 140, or the upstream optical signal separated by the wavelength band separator/coupler 150. The circulation type wavelength-demultiplexer 160 is a wavelength-multiplexer/de-multiplexer implemented so as to make a center wavelength of a channel and a frequency interval thereof have regular values, and may be configured by a circulation type AWG capable of wavelength-demultiplexing both the downstream optical signal and the upstream optical signal.

The optical receiver 170 outputs a downstream electrical signal by using the optical signal having been wavelength-demultiplexed by the circulation type wavelength-demultiplexer 160. To this end, the optical receiver 170 includes a Received Signal Strength Indication (RSSI) type optical receiver 172, a 1×2 electrical signal power distributor 174, and an electrical filter 176.

The RSSI type optical receiver 172 detects the signal strength of the optical signal wavelength-demultiplexed by the circulation type wavelength-demultiplexer 160 and converts the optical signal into an electrical signal.

The 1×2 electrical signal power distributor 174 divides the electrical signal having been converted by the RSSI type optical receiver 172 into a high speed upstream electrical signal and a low speed downstream electrical signal, and transmits the high speed upstream electrical signal to an upper layer and transmits the low speed downstream electrical signal to the signal processing module 180 through the electrical filter 176.

The signal processing module 180 controls the optical power and wavelength of the optical transmitter 110 according to the strength of the downstream electrical signal having passed through the electrical filter 176.

Therefore, the OLT 100 according to the present invention can divide frequency domains of the high speed upstream optical signal and the low speed control/monitoring downstream optical signal from each other, and intercepts, by using the wavelength band separator/coupler 150, a reflection signal generated at a cross section of an optical part and a backscattering optical signal of an optical fiber at the time of transmission of the control/monitoring downstream optical signal, so that it is possible to implement a high quality OLT capable of controlling and monitoring an optical transmitter.

Figure 2:
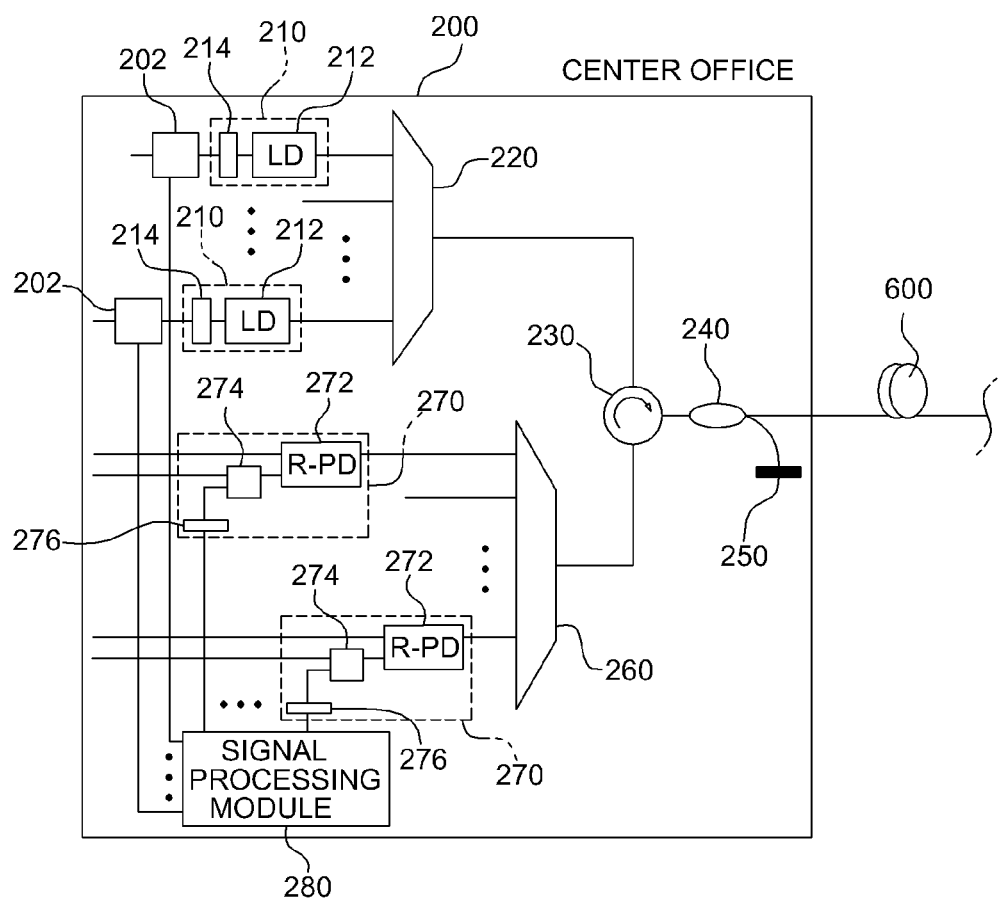
FIG. 2 is a block diagram illustrating a construction of an optical line terminal for controlling and monitoring an optical power and a wavelength of downstream optical signals in a bidirectional wavelength-division-multiplexing (WDM) based optical network according to a second embodiment of the present invention.

FIG. 2 is a block diagram illustrating a construction of an optical line terminal for controlling and monitoring an optical power and a wavelength of downstream optical signals in a bidirectional wavelength-division-multiplexing (WDM) based optical network according to a second embodiment of the present invention.

Referring to FIG. 2, an OLT 200 according to the second embodiment of the present invention is mostly similar to elements of the OLT 100 of FIG. 1, excepting that the OLT 200 according to the second embodiment of the present invention includes an optical circulator 230 and a reflection type tap coupler 240 instead of the wavelength band separator/coupler 150 and the two optical power branching tap couplers 130 and 140 of the OLT 100 of FIG. 1. Therefore, an explanation for elements other than the optical circulator 230 and the reflection type tap coupler 240 will be omitted.

The optical circulator 230 circulates a downstream optical signal wavelength-multiplexed by a wavelength-multiplexer 220 or an upstream optical signal wavelength-multiplexed by the wavelength-multiplexer 710 of the RN 700 and transmits wavelength-multiplexed downstream optical signal or wavelength-multiplexed upstream optical signal to the reflection type tap coupler 240.

Further, the optical circulator 230 recirculates an optical signal reflected by the reflection type tap coupler 240 and transmits the optical signal to a circulation type wavelength-multiplexer 260.

The reflection type tap coupler 240 reflects optical signals transmitted through the optical circulator 230 by using a reflector 250.

Therefore, since the OLT 200 according to the second embodiment of the present invention includes the optical circulator 230 and the reflection type tap coupler 240 instead of the wavelength band separator/coupler 150 and optical power branching tap couplers 130 and 140 of the OLT 100 of FIG. 1, it can reduce system construction costs.

Figure 3:
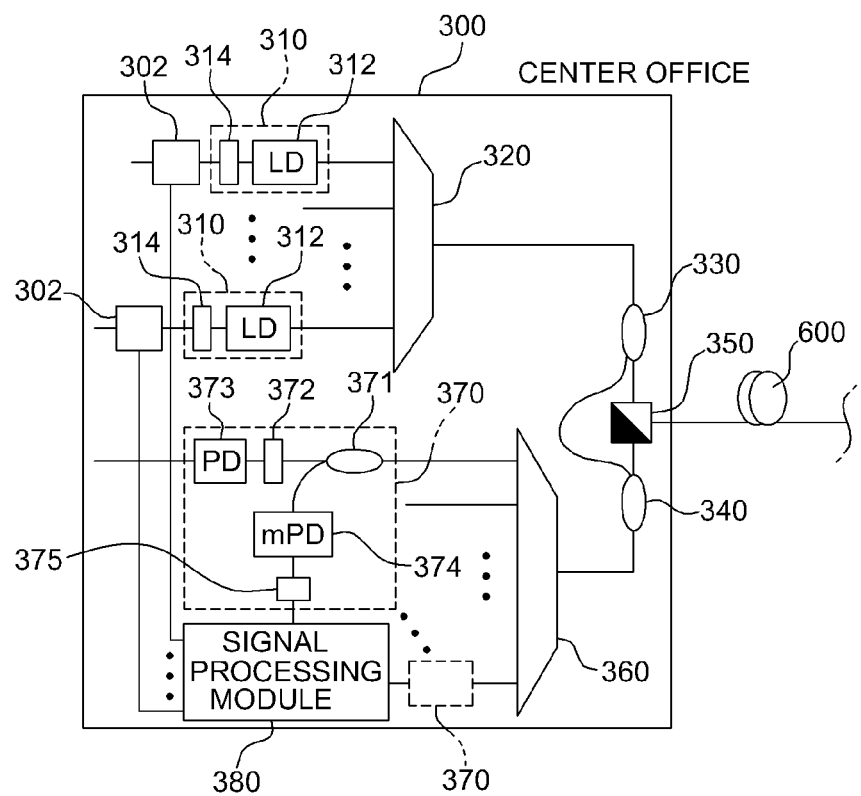
FIG. 3 is a block diagram illustrating a construction of an optical line terminal for controlling and monitoring an optical power and a wavelength of downstream optical signals in a bidirectional wavelength-division-multiplexing (WDM) based optical network according to a third embodiment of the present invention.

FIG. 3 is a block diagram illustrating a construction of an optical line terminal for controlling and monitoring an optical power and a wavelength of downstream optical signals in a bidirectional wavelength-division-multiplexing (WDM) based optical network according to a third embodiment of the present invention.

Referring to FIG. 3, most elements of an OLT 300 according to the third embodiment of the present invention are similar to the elements of the OLT 100 of FIG. 1, excepting that construction of an optical receiver 370 is different.

That is, while the optical receiver 170 of the OLT 100 of the FIG. 1 includes the RSSI type optical receiver 172, the 1×2 electrical signal power distributor 174, and the electrical filter 176, the optical receiver 370 of the OLT 300 according to the third embodiment of the present invention includes an optical power branching tap coupler 371, an optical filter 372, a typical optical receiver 373, a signal-detectable light-receiving device 374, and an electrical filter 375.

The optical power branching tap coupler 371 allows the optical signal wavelength-demultiplexed by a circulative wavelength-demultiplexer 360 to branch off.

The optical filter 372 interrupts downstream optical signals among the optical signal branched off by the optical power branching tap coupler 371.

The typical optical receiver 373 converts the optical signal passed through the optical filter 372 into the electrical signal.

The signal-detectable light-receiving device 374 detects the downstream optical signal among the optical signal branched off by the optical power branching tap coupler 371 and converts the branched off optical signal into a downstream electrical signal.

The electrical filter 375 passes only the downstream electrical signal converted by the signal-detectable light-receiving device 374.

Therefore, the OLT 300 according to the third embodiment of the present invention may be easily configured by using the typical optical receiver 373. Further, since the upstream optical signal and the downstream optical signal are separated from each other before they are converted into the electrical signals, it can enhance the performance of the system.

Figure 4:
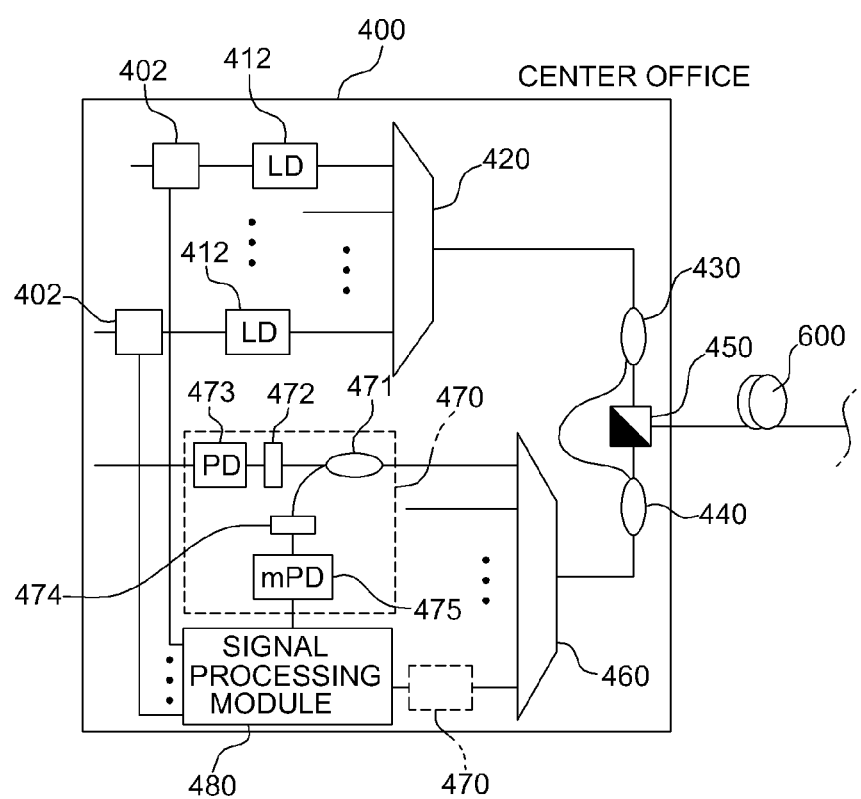
FIG. 4 is a block diagram illustrating a construction of an optical line terminal for controlling and monitoring an optical power and a wavelength of downstream optical signals in a bidirectional wavelength-division-multiplexing (WDM) based optical network according to a fourth embodiment of the present invention.

FIG. 4 is a block diagram illustrating a construction of an optical line terminal for controlling and monitoring an optical power and a wavelength of downstream optical signals in a bidirectional wavelength-division-multiplexing (WDM) based optical network according to a fourth embodiment of the present invention.

Referring to FIG. 4, an OLT 400 according to the fourth embodiment of the present invention does not include the electrical filter 375 located behind the signal-detectable light-receiving device 374 and the low frequency generator 314 of an optical transmitter 310 of the OLT 300 of FIG.3, and includes an optical filter 474 located before a signal-detectable light-receiving device 475 instead of the electrical filter 375, wherein the optical filter 474 passes only the downstream optical signal.

Therefore, since the low frequency generator of the optical transmitter and the electrical filter of the optical receiver are removed in the OLT 400 according to the fourth embodiment of the present invention, the OLT 400 according to the fourth embodiment of the present invention has a simplified electric circuit construction. As a result, it is possible to implement the OLT 400 according to the fourth embodiment of the present invention.

Figure 5:
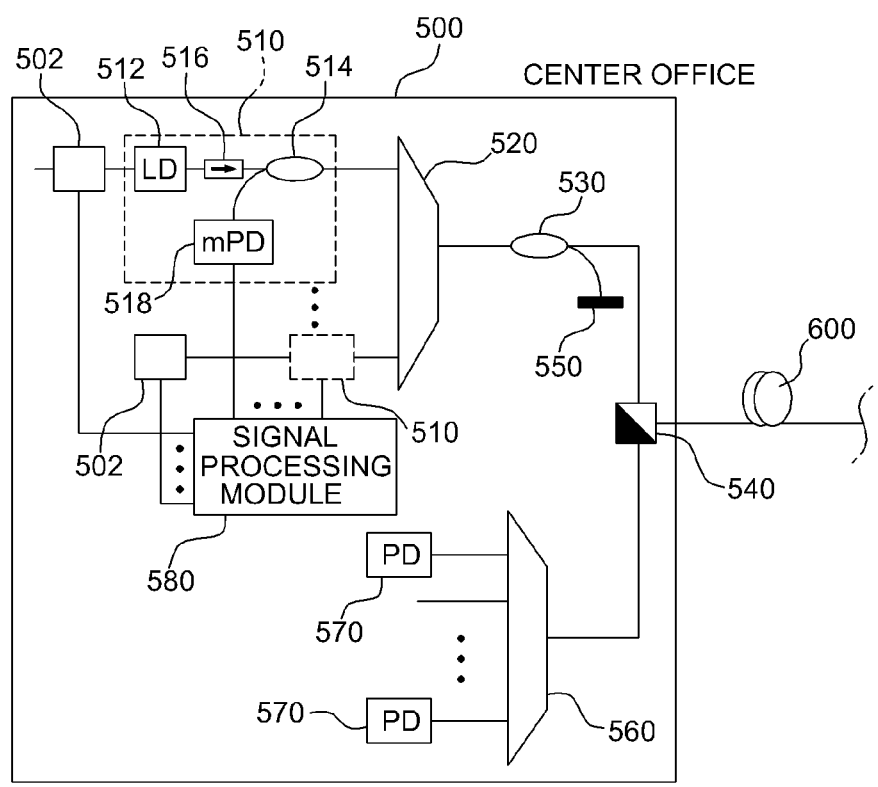
FIG. 5 is a block diagram illustrating a construction of an optical line terminal for controlling and monitoring an optical power and a wavelength of downstream optical signals in a bidirectional wavelength-division-multiplexing (WDM) based optical network according to a fifth embodiment of the present invention.

FIG. 5 is a block diagram illustrating a construction of an optical line terminal for controlling and monitoring an optical power and a wavelength of downstream optical signals in a bidirectional wavelength-division-multiplexing (WDM) based optical network according to a fifth embodiment of the present invention.

Referring to FIG. 5, in an OLT 500 according to the fifth embodiment of the present invention, a position of a signal-detectable light-receiving device 518 is different from the OLT 400 of FIG. 4. That is, while the signal-detectable light-receiving device 475 of the OLT 400 of FIG. 4 is located in the optical receiver 470, the signal-detectable light-receiving device 518 of the OLT 500 according to the fifth embodiment of the present invention is located in an optical transmitter 510. Therefore, the optical transmitter 510 of the OLT 500 according to the fifth embodiment of the present invention includes an optical source 512, an optical power branching tap coupler 514, an optical isolator 516 and the signal-detectable light-receiving device 518.

In addition, the OLT 500 according to the fifth embodiment of the present invention further includes a reflection type tap coupler 530 located before a wavelength-multiplexer 520.

The reflection type tap coupler 530 reflects a downstream optical signal wavelength-multiplexed by the wavelength-multiplexer 520 by using a reflector 550, so as to feed back the wavelength-multiplexed downstream optical signal to the wavelength-multiplexer 520.

The wavelength-multiplexer 520 wavelength-demultiplexes the downstream optical signal having been fed back by the reflection type tap coupler 530.

The optical power branching tap coupler 514 allows the downstream optical signal wavelength-demultiplexed by the optical source 512 to branch off.

The optical isolator 516 prevents the downstream optical signal branched off by the optical power branching tap coupler 514 from going into the optical source 512.

The signal-detectable light-receiving device 518 converts the downstream optical signal branched off by the optical power branching tap coupler 514 into the electrical signal.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:
1. An optical line terminal for controlling and monitoring an optical power and a wavelength of downstream optical signals in a bidirectional wavelength-division-multiplexing (WDM) based optical network, comprising:
   an optical transmitter for generating a low speed downstream optical signal;
   a wavelength-multiplexer for wavelength-multiplexing the downstream optical signal;
   a first optical power branching tap coupler for allowing wavelength-multiplexed downstream optical signal to branch off;
   a wavelength band separator/coupler for separating between the wavelength-multiplexed downstream optical signal and a wavelength-multiplexed upstream optical signal;
   a circulation type wavelength-demultiplexer for wavelength-demultiplexing a downstream optical signal branched off by the first optical power branching tap coupler and an upstream optical signal separated by the wavelength band separator/coupler;
   an optical receiver for outputting a downstream electrical signal by using the wavelength-demultiplexed optical signal; and a signal processing module for controlling an optical power and a wavelength of the optical transmitter according to a strength of the downstream electrical signal.

2. The optical line terminal of claim 1, wherein the optical transmitter generates the low speed downstream optical signal by adding a modulation signal of a low frequency band to a high speed downstream optical signal.

3. The optical line terminal of claim 2, wherein the optical transmitter comprises:
an optical source for generating the high speed downstream optical signal; and
a low frequency generator for generating the modulation signal of the low frequency band.

4. The optical line terminal of claim 3, wherein the optical source is one among a wavelength-tunable laser optical source, a wavelength-fixed laser optical source, a broadband incoherent optical source, and an external-insert wavelength-fixed broadband optical source.

5. The optical line terminal of claim 1, wherein the wavelength-multiplexer is configured by an Arrayed Waveguide Grating (AWG) and a thin film filter.

6. The optical line terminal of claim 1, wherein the circulation type wavelength-demultiplexer is configured by a circulation type AWG.

7. The optical line terminal of claim 1, wherein the optical receiver comprises:
a reception power detectable optical receiver for detecting a signal strength of the wavelength-demultiplexed optical signal and converting the wavelength-demultiplexed optical signal into the electrical signal;
a 1×2 electrical signal power distributor for dividing the electrical signal into the high speed upstream electrical signal and the low speed downstream electrical signal; and
an electrical filter for passing only the downstream electrical signal.

8. The optical line terminal of claim 1, wherein the optical receiver comprises:
a second optical power branching tap coupler for allowing the wavelength-demultiplexed optical signal to branch off;
an optical filter for interrupting the downstream optical signal among the optical signals branched off by the second optical power branching tap coupler;
a typical optical receiver for converting the optical signal passed through the optical filter into the electrical signal;
a signal-detectable light-receiving device for detecting the downstream optical signal among the optical signals branched off by the second optical power branching tap coupler and converting the downstream optical signal into the downstream electrical signal; and
an electrical filter for passing only the downstream electrical signal.

9. An optical line terminal for controlling and monitoring an optical power and a wavelength of downstream optical signals in a bidirectional wavelength-division-multiplexing (WDM) based optical network, comprising:
an optical transmitter for generating a high speed downstream optical signal;
a wavelength-multiplexer for wavelength-multiplexing the downstream optical signal;
a first optical power branching tap coupler for allowing the wavelength-multiplexed downstream optical signal to branch off;
a wavelength band separator/coupler for separating between the wavelength-multiplexed upstream optical signal and a wavelength-multiplexed downstream optical signal;
a circulation type wavelength-demultiplexer for wavelength-demultiplexing the downstream optical signal branched off by the first optical power branching tap coupler and the upstream optical signal separated by the wavelength band separator/coupler;
an optical receiver for outputting the downstream electrical signal by using the wavelength-demultiplexed optical signal; and
a signal processing module for controlling an optical power and a wavelength of an optical transmitter according to a strength of the downstream electrical signal.

10. The optical line terminal of claim 9, wherein the optical transmitter comprises an optical source for generating the high speed downstream optical signal.

11. The optical line terminal of claim 9, wherein the optical receiver comprises:
a second optical power branching tap coupler for allowing the wavelength-demultiplexed optical signal to branch off;
a first optical filter for interrupting the downstream optical signal among the optical signals branched off by the second optical power branching tap coupler;
a typical optical receiver for converting the optical signal passed through the first optical filter into the electrical signal;
a second optical filter for passing only the downstream optical signal among the optical signals branched off by the second optical power branching tap coupler; and
a signal-detectable light-receiving device for converting the downstream optical signal passing through the second optical filter into the downstream electrical signal.

* * * * *